(12) United States Patent
Neiman (10) Patent No.: US 9,702,385 B2
(45) Date of Patent: Jul. 11, 2017

(54) MACHINE TOOL ASSEMBLY CONFIGURED FOR SWIFT DISASSEMBLY

(71) Applicant: Iscar, Ltd., Tefen (IL)

(72) Inventor: Grigori Neiman, Kiryat Ata (IL)

(73) Assignee: Iscar, Ltd., Tefen (IL)

( * ) Notice: Subject to any disclaimer, the term of this patent is extended or adjusted under 35 U.S.C. 154(b) by 246 days.

(21) Appl. No.: 14/278,088

(22) Filed: May 15, 2014

(65) Prior Publication Data

US 2015/0330423 A1  Nov. 19, 2015

(51) Int. Cl.
| | | |
|---|---|---|
| *F16B 1/00* | (2006.01) | |
| *F16B 35/04* | (2006.01) | |
| *B23B 27/00* | (2006.01) | |
| *B23B 29/04* | (2006.01) | |
| *F16B 41/00* | (2006.01) | |

(52) U.S. Cl.
CPC ............... *F16B 1/00* (2013.01); *B23B 27/00* (2013.01); *B23B 29/046* (2013.01); *F16B 35/04* (2013.01); *F16B 41/002* (2013.01); *Y10T 29/49824* (2015.01)

(58) Field of Classification Search
CPC .......... F16B 1/00; F16B 35/04; F16B 41/002; B23B 27/00; B23B 29/046
USPC ....... 407/101–104; 411/999; 408/238, 239 R
See application file for complete search history.

(56) References Cited

U.S. PATENT DOCUMENTS

| | | | | |
|---|---|---|---|---|
| 2,924,129 A | * | 2/1960 | Munro .................. | B23B 27/007 407/65 |
| 3,002,405 A | * | 10/1961 | Heftler .................... | B23B 27/16 407/107 |
| 3,186,160 A | * | 6/1965 | Dickerman .......... | G04B 18/023 368/174 |
| 3,241,307 A | * | 3/1966 | Dickerman .......... | G04B 18/023 368/170 |
| 3,245,288 A | * | 4/1966 | Fried ..................... | B23B 27/007 407/111 |
| 3,289,273 A | * | 12/1966 | Artaud .................... | B23B 29/03 235/133 R |
| 3,633,258 A | * | 1/1972 | Szabo ................... | B23B 27/007 407/48 |
| 3,647,307 A | * | 3/1972 | Kosker ............. | B23B 29/03407 408/153 |
| 3,780,408 A | * | 12/1973 | McCreery ............. | B23B 29/043 407/101 |
| 3,859,699 A | * | 1/1975 | Lindskog .............. | B23B 29/022 407/109 |

(Continued)

FOREIGN PATENT DOCUMENTS

| | | | | |
|---|---|---|---|---|
| GB | 2081143 A | * | 2/1982 | ....... B23B 29/03417 |
| KR | WO 2011030936 A1 | * | 3/2011 | ........... B23B 27/007 |

OTHER PUBLICATIONS

Search report dated Aug. 24, 2015 issued in PCT counterpart application (No. PCT/IL2015/050408.

*Primary Examiner* — Sara Addisu
(74) *Attorney, Agent, or Firm* — Womble Carlyle (57) ABSTRACT

A machine tool assembly including a body component, a head component and a fastener. The body and head components respectively include a body hole and a head hole. The fastener is configured to secure the head component to the body component via insertion through the head hole and attachment to the body hole. The head hole includes a head fastener retention arrangement for preventing unintentional ejection of the fastener therefrom.

13 Claims, 3 Drawing Sheets

(56) References Cited

U.S. PATENT DOCUMENTS

| | | | | |
|---|---|---|---|---|
| 3,885,282 A | | 5/1975 | Pataky | |
| 4,087,194 A | * | 5/1978 | Takacs | B23B 29/03 407/100 |
| 4,102,591 A | * | 7/1978 | Alcorn | B23B 27/007 407/100 |
| 4,270,422 A | * | 6/1981 | Andersson | B23B 29/046 407/101 |
| 4,314,296 A | * | 2/1982 | Whittle | G11B 5/56 360/128 |
| 4,332,513 A | * | 6/1982 | Gowanlock | B23B 27/04 407/101 |
| 4,557,642 A | * | 12/1985 | Duda/ s | B23B 31/008 279/8 |
| 4,583,886 A | | 4/1986 | Drescher | |
| 4,606,680 A | * | 8/1986 | Striegl | B23B 29/03421 408/147 |
| 4,611,959 A | | 9/1986 | Kress et al. | |
| 4,632,614 A | * | 12/1986 | Rall | B23B 29/046 279/58 |
| 4,655,655 A | * | 4/1987 | Schurfeld | B23B 29/046 403/380 |
| 5,059,075 A | * | 10/1991 | Kelly | F16B 41/002 411/107 |
| 5,255,582 A | * | 10/1993 | Robertson | B23B 29/046 407/101 |
| 5,555,784 A | * | 9/1996 | Muendlein | B23B 27/00 407/101 |
| 5,607,263 A | * | 3/1997 | Nespeta | B23B 27/007 407/53 |
| 5,688,080 A | * | 11/1997 | Hedlund | B23B 27/04 407/101 |
| 5,709,508 A | * | 1/1998 | Barazani | B23B 27/045 407/101 |
| 5,833,403 A | * | 11/1998 | Barazani | B23B 27/007 407/101 |
| 5,873,682 A | * | 2/1999 | Tripsa | B23B 29/046 407/101 |
| 6,146,060 A | * | 11/2000 | Rydberg | B23B 27/08 407/101 |
| 6,312,201 B1 | * | 11/2001 | Nagaya | B23B 27/007 279/103 |
| 6,599,050 B1 | * | 7/2003 | Sjoo | B23B 31/008 403/374.3 |
| 6,880,437 B2 | * | 4/2005 | Sjoo | B23B 29/043 407/101 |
| 6,960,049 B2 | * | 11/2005 | Inayama | B23B 27/08 407/103 |
| 6,966,728 B1 | * | 11/2005 | Erickson | B23B 29/046 407/101 |
| 6,969,218 B2 | * | 11/2005 | Lach | B23B 27/06 407/100 |
| 7,001,114 B2 | * | 2/2006 | Blucher | B23B 27/007 407/103 |
| 7,112,021 B2 | * | 9/2006 | Pantzar | B23B 31/11 279/8 |
| 8,042,437 B2 | * | 10/2011 | Maier | B23B 29/043 408/226 |
| 8,479,622 B2 | | 7/2013 | Hecht | |
| 9,272,343 B2 | * | 3/2016 | Voege | B23C 5/1045 |
| 2008/0079449 A1 | * | 4/2008 | Hobbs | G01R 1/07364 324/750.25 |
| 2011/0142565 A1 | * | 6/2011 | Pudvah | F16B 41/002 411/107 |
| 2012/0170983 A1 | * | 7/2012 | Park | B23B 27/007 407/11 |
| 2014/0321928 A1 | * | 10/2014 | Guy | B23C 5/10 407/45 |
| 2015/0086292 A1 | * | 3/2015 | Sage | F16B 35/005 411/81 |
| 2015/0125224 A1 | * | 5/2015 | Schmidt | B23B 29/10 407/73 |
| 2015/0290716 A1 | * | 10/2015 | Herberth | B23B 25/02 407/11 |
| 2015/0330423 A1 | * | 11/2015 | Neiman | F16B 1/00 411/81 |

* cited by examiner

MACHINE TOOL ASSEMBLY CONFIGURED FOR SWIFT DISASSEMBLY

FIELD OF THE INVENTION

The subject matter of the present application relates to machine tool assemblies configured with fasteners for securing head components to body components, and more particularly configured for swift removal of the head components from the body components.

BACKGROUND OF THE INVENTION

Machine tool assemblies, used for machining materials such as steel, have been extensively developed over the last century, with each incremental development further improving the efficiency thereof in a highly competitive worldwide marketplace.

Machine tool assemblies often comprise detachable, replaceable components to improve cost efficiency and/or usability. For example, rather than produce a large monolithic tool made of cemented carbide, a tool of a cheaper material with only a small connectable element (e.g., a cutting insert) of cemented carbide can be made, the smaller element being replaceable when worn, thereby increasing overall cost efficiency of the tool materials. Nonetheless, production, assembly and disassembly of connectable components are not without associated difficulties and costs.

A known problem, in particular for small machine tools, is that small dynamic fastening elements (hereinafter "fasteners", e.g. screws) can accidentally fall to the ground during attachment or detachment of components.

One possible solution can be to use a retention element such as a circlip.

U.S. Pat. No. 8,479,622, assigned to the present Applicant, discloses a machine tool assembly having a replaceable tool head and also, inter alia, mentions a disadvantage of falling parts.

SUMMARY OF THE INVENTION

In accordance with a first aspect of the subject matter of the present application, there is provided a machine tool assembly comprising: a body component; a head component; and a fastener comprising a fastener head and a fastener shank extending therefrom, the fastener shank having an external shank threading; the body component comprising: a first body surface; a body fastening arrangement formed on the first body surface; and a body hole opening out to the first body surface; the head component comprising: first and second head surfaces; a head fastening arrangement formed on the second head surface and configured to interlock with the body fastening arrangement; and a head hole opening out at a first head hole end to the first head surface and at a second head hole end to the second head surface; wherein: the head hole is formed with an internal head threading and the body hole is formed with an internal body threading; the body threading and the head threading are each configured to threadingly engage the external shank threading; and in an assembled, fastened position, the head component is held to the body component via interlocking of the head and body fastening arrangements, and the fastener shank extends through the head hole and into the body hole, with the fastener head abutting the first head surface and the shank threading engaging the body threading.

Even though a fastening arrangement formed on head and body components may be configured to hold the head and body components together in an upright orientation, even without a fastener, in a non-upright orientation the head component and/or the fastener may be prone to unintentionally falling. In such situation a head fastener retention arrangement (e.g. a head threading) can prevent unintentional falling of the fastener. One possible advantage of a head fastener retention arrangement is that a user does not need to be concerned the fastener can fall, and can use one hand to ensure the head component does not fall and their other hand to disengage the fastener, e.g. unscrew it from the body component, without concern that the fastener may fall during disengagement.

In accordance with another aspect of the subject matter of the present application, there is provided a machine tool assembly comprising: a head component comprising a head hole formed with a head fastener retention arrangement; a body component comprising a body hole comprising a body fastener retention arrangement; and a fastener configured to secure the head component to the body component via the head hole and the body's fastener retention arrangement; the head fastener retention arrangement being configured to obstruct removal of the fastener from the head hole with only translational movement of the fastener relative to the head hole, while being configured to allow removal of the fastener from the head hole with combined translational and rotational movement of the fastener relative to the head hole.

In accordance with yet another aspect of the subject matter of the present application, there is provided a machine tool assembly comprising head and body components and a fastener; the head component comprising a head hole formed with a head fastener retention arrangement; the head component being configured to be attached, using the fastener, to the body component; the fastener comprising a fastener head and a fastener shank extending therefrom; the fastener shank comprising a threaded shank portion distal from the fastener head and a non-threaded shank portion adjacent to the fastener head.

In accordance with another aspect of the subject matter of the present application, there is provided a machine tool assembly comprising head and body components configured to be held to one another via a fastener; the head component comprising a head hole formed with a head fastener retention arrangement.

Any of the aspects above can be advantageous for one or more of the following reasons:

a. A user can swiftly remove a head component from a body component, with reduced concern for falling parts (a head component and/or a fastener). It will be understood that a machining process can take into account replacement time, which is related to labor costs.

b. A user can more surely remove a head component, without concern of accidental ejection of a fastener from a hole (it will also be understood that it can be difficult to determine a remaining amount of a fastener inside a hole).

c. A user can more confidently remove relatively smaller tools. This advantage may be particularly pertinent for, e.g., internal machining applications, or where a fastener is, e.g., a screw of size "M5" (and all the more so for even smaller sizes), since it is harder to hold small components in one's hand.

d. It will be further noted that while known mass produced solutions such as circlips can be cheaply obtained, such may add assembly time and handling of small components can be less user friendly than an integrally formed fastener retention arrangement. The subject matter of the present application can have fewer components than similar constructions utilizing a circlip or like device. Specifically, referring to a connection arrangement of a head and body component, the machine assembly can in total comprise a total three components, namely the head and body components and the fastener. Stated differently, a machine tool assembly can comprise only a single non-integral component (i.e. a fastener) for connecting head and body components.

e. A machine tool assembly with both static fastening arrangements (e.g. complimentary integrally formed head and body fastening arrangements) and a dynamic auxiliary fastening arrangement (i.e. a fastener and complimentary construction therefor) can possibly be removed faster than a machine tool assembly with a plurality of (dynamic) fasteners, since each fastener needs to be disengaged from the body component.

It will be understood that such advantages may also be applicable to the following method aspects.

In accordance with still another aspect of the subject matter of the present application, there is provided a method of assembling and disassembling a machine tool assembly according to any of the previous aspects, comprising the following steps: interlocking head and body fastening arrangements; mounting a fastener to a head component by combined rotational and translational movement either before or after step (a); subsequent to steps (a) and (b), engaging a fastener shank to a body hole; and comprising the following disassembly steps: disengaging the fastener shank from the body hole only; and subsequent to step (d), disengaging the head and body fastening arrangements.

In accordance with yet another aspect of the subject matter of the present application, there is provided a method of disassembling a head component from a body component; the head and body components being fastened together by a fastener extending through a head hole of the head component and into a body hole of the body component; the head hole comprising a head fastener retention arrangement; the method comprising the following steps: (a) withdrawing the fastener from the body hole by combined translational and rotational movement: (b) removing the head component from the body component while the head fastener retention arrangement prevents ejection of the fastener from the head hole by only translational movement of the fastener relative to the head hole.

It will be understood that the above-said is a summary, and that any of the aspects above may further comprise any of the features described hereinbelow. Specifically, the following features, either alone or in combination, may be applicable to any of the above aspects:

A. A machine tool assembly can comprise a body component, a head component and a fastener.

B. A fastener can comprise a fastener head and a fastener shank extending therefrom.

C. A fastener can be configured to secure a head component to a body component via a head hole and a body fastener retention arrangement.

D. A fastener head can have a larger circumscribing diameter than a fastener shank (i.e. when measured in a plane perpendicular to a longitudinal axis extending through the fastener shank).

E. A fastener shank can comprise an external arrangement configured to engage a head fastener retention arrangement. The external arrangement can be configured to abut the head fastener retention arrangement (e.g. by the external arrangement having a circumscribed circle of radius greater than a radius of a head fastener retention arrangement's inscribed circle) during only relative translational movement. The external arrangement can be configured to bypass the head fastener retention arrangement during relative translational and at least some rotational movement.

F. An external arrangement can be an external shank threading. The shank threading can be configured to threadingly engage a threading on a body component. The shank threading can be configured to threadingly engage a head fastener retention arrangement (e.g. an internal head threading). The shank threading can be configured to engage the body threading and the head threading.

G. A fastener shank can comprise a first shank portion and a second shank portion extending between the first shank portion and a fastener head. The second shank portion can have a circumscribed circle smaller than an inscribed circle of a head fastener retention arrangement. The second shank portion can be devoid of an external arrangement configured to engage a head fastener retention arrangement (e.g. it can be devoid of threading). Stated differently, an external arrangement (e.g. a shank threading) can be formed on only the first shank portion, and the second shank portion can be devoid of such external arrangement. One possible advantage of such arrangement can be translational movement of a fastener during assembly (discussed below in connection with FIGS. 5B and 5C). Another possible advantage can be a reduced number of rotations needed for, e.g., removing a fastener from a head component.

H. A second shank portion can be longer than a head hole. A second shank portion can be longer than a first shank portion.

I. A body component can comprise a first body surface. The body component can be elongated. The body component can comprise a second body surface located at an opposing side of the body component from the first body surface, and one or more peripheral surfaces extending between the first and second body surfaces.

J. A body component can comprise a body fastening arrangement formed on a first body surface. Stated differently the body fastening arrangement can be integrally formed on the first body surface.

K. A body component can comprise a body hole opening out to the first body surface.

L. A body hole can comprise a body fastener retention arrangement. The body fastener retention arrangement can be an internal body threading formed in the body hole.

M. A first body surface can form an acute internal angle $\beta$ with a body hole axis of a body hole, as follows: $20° \leq \beta \leq 60°$. It will be understood that a component which comprises an acute internal angle between two elements will also comprise a corresponding obtuse internal angle wherein the sum of the acute and obtuse angles will be 180°. Accordingly, in the present application, references are only to the acute internal angles of the complimentary angles.

N. A head component can comprise first and second head surfaces. The first and second head surfaces can be adjacent surfaces, i.e. sharing a common edge.

O. A first head surface can be formed with an insert seating arrangement. The insert seating arrangement can be configured for receiving a removable cutting insert (e.g. the insert seating arrangement can be formed with a threaded hole or lever hole).

P. A second head surface can form an acute internal angle $\alpha$ with a head hole axis of a head hole, as follows: $20° \leq \alpha \leq 60°$.

Q. A head component can comprise a head fastener retention arrangement formed in a head hole. The head fastener retention arrangement can be configured to obstruct removal of a fastener from the head hole with only translational movement of the fastener relative to the head hole, while being configured to allow removal of the fastener from the head hole with combined translational and rotational movement of the fastener relative to the head hole.

R. A head component can comprise a head fastening arrangement formed on a second head surface. Stated differently the head fastening arrangement can be integrally formed on the second head surface. The head fastening arrangement can be configured to interlock with a body fastening arrangement.

S. A head component can comprise a head hole.

T. A head hole can open out at a first head hole end to a first head surface and at a second head hole end to a second head surface.

U. A head hole can comprise a head hole inner surface. The head hole inner surface can further comprise a cylindrical head hole portion and a tapered head hole portion. The cylindrical head hole portion can be adjacent to a second head surface and the tapered head hole portion can be adjacent to a first head surface.

V. A head hole can be formed with a head fastener retention arrangement. The head fastener retention arrangement can be an internal head threading. More precisely, a head hole inner surface can be formed with the head fastener retention arrangement. Even more precisely, the head fastener retention arrangement can be formed on a cylindrical head hole portion of the head hole inner surface. Still more precisely, the head fastener retention arrangement can be formed on the cylindrical head hole portion at a portion thereof adjacent to a tapered head hole portion of the head hole inner surface.

W. A head threading can extend circumferentially around a head hole less than the body threading extends circumferentially around the body hole. The head threading can preferably extend less than three revolutions around the head hole. The head threading can even extend less than one revolution around the head hole. It will be understood that even a small head fastener retention arrangement can provide a retention function, and that with a comparatively small circumferential extension a fastener can be more quickly released when desired. For example a head fastener retention arrangement can extend less than one revolution around a head hole.

X. A head threading can extend an axial extent through a head hole less than an axial extent of a body threading through a body hole. It will be understood that even a small head fastener retention arrangement can provide a retention function, whereas a larger retention arrangement (e.g. the body threading) may be required for providing a fastening force for head and body components.

Y. In an assembled, fastened position, a head component can be held to a body component via interlocking of head and body fastening arrangements, and a fastener shank can extend through a head hole and into a body hole, with a fastener head abutting a first head surface and a shank threading engaging a body threading.

Z. A machine tool assembly can comprise only a single fastener configured for connecting head and body components. It will be understood that a possible advantage of which is that swifter removal of a head component can be achieved if only one fastener has to be unfastened, compared with an assembly with a plurality of fasteners. It will also be understood that a single fastener referred to here is a separate element from the head and body components and hence such machine tool assembly can also comprise integrally formed fastener arrangements in addition to the single fastener.

AA. Head and body components can be interlocked via head and body fastening arrangements. The interlocking can be via sliding movement of a first body surface relative to a second head surface (i.e. requiring at least some movement parallel to the first body surface and second head surface).

BB. A head component can be made of metal. A head component can made of a harder material than a fastener. It will be understood that the subject matter of the present application can provide a particular advantage for machine assembly head component materials (typically steel) which on the one hand provides an advantage to pre-forming a head fastener retention arrangement due to the hardness/solid structure of the material (e.g. steel) and on the other hand enables a fastener to be retained or removed when desired.

CC. Mounting a fastener to a head component can be by combined rotational and translational movement. The mounting can be either before or after interlocking head and body fastening arrangements. Subsequent to the mounting, shank threading and body threading can be engaged.

DD. In an assembled, fastened position, the only contacting portions of head and body components can be a first body surface and second head surface.

EE. In an assembled, fastened position, the only contacting portions of a head component and a fastener can be a fastener head and a first head surface.

FF. In an assembled, fastened position, the only contacting portions of a body component and a fastener can be an external arrangement of the fastener (e.g. an external threading formed on the shank thereof) and a body fastener retention arrangement (e.g. an internal body threading).

GG. The shank threading can be configured with a length that, when the fastener is fastened to the body threading, the shank threading does not contact the head threading. Stated differently, in an assembled, fastened position, the shank threading can contact only the body threading.

HH. When disassembling a machine tool assembly, shank threading can be disengaged from body threading only (e.g. without removing a fastener from a head component's fastener retention arrangement). Subsequent to disengaging the shank threading from the body threading, head and body fastening arrangements can then be disengaged. The disengagement can comprise a sliding movement of the first body surface relative to the second head surface. The disengagement can also comprise a translational movement, after the sliding movement, of the first body surface relative to the second head surface in a direction parallel with a body hole axis of the body hole. The translational movement can distance head and body components from each other.

II. When a shank threading is formed on only a first shank portion and a second shank portion is devoid of threading; removing a fastener from a head component can be by moving the fastener along a head hole together with a rotational movement.

JJ. After mounting a fastener to a head component and before interlocking head and body fastening arrangements, a fastener's shank can be abutted against the first body surface, moving the fastener in a head hole towards a first head hole end. The shank can be abutted against the first body surface until engagement of a fastener threading against a head threading halts movement of the fastener relative to the head hole.

BRIEF DESCRIPTION OF THE DRAWINGS

For a better understanding of the subject matter of the present application, and to show how the same may be carried out in practice, reference will now be made to the accompanying drawings, in which:

FIGS. 5A to 5D are cross section views generally corresponding to views in FIGS. 4B and 4C, and further including the fastener of the tool assembly in FIG. 1; FIGS. 5A to 5D are in different operational positions, more specifically:

DETAILED DESCRIPTION

Figure 1:
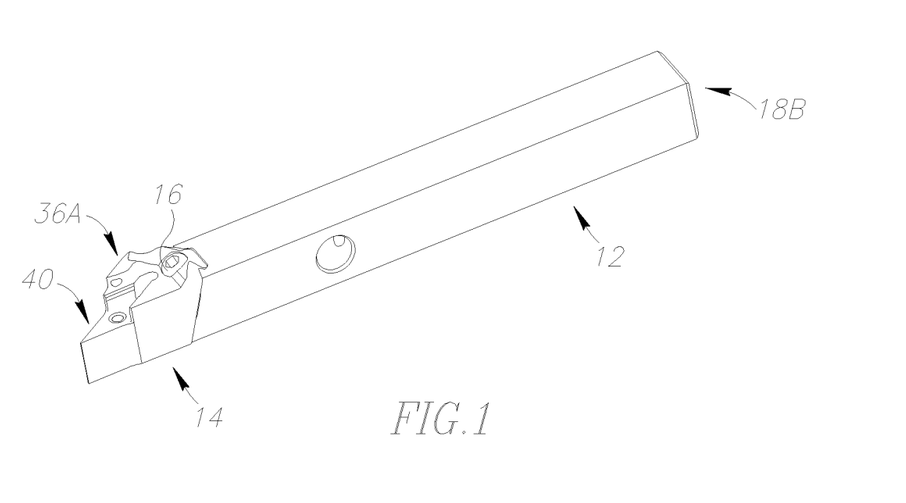
FIG. 1 is a perspective view of a machine tool assembly in accordance with the subject matter of the present application.
Figure 2:
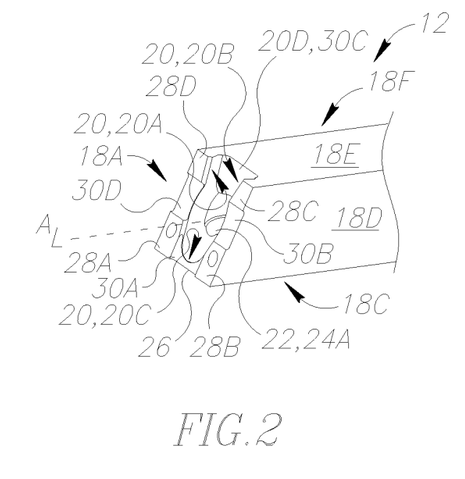
FIG. 2 is a perspective side view of a part of a body component of the tool assembly in FIG. 1.
Figure 3:
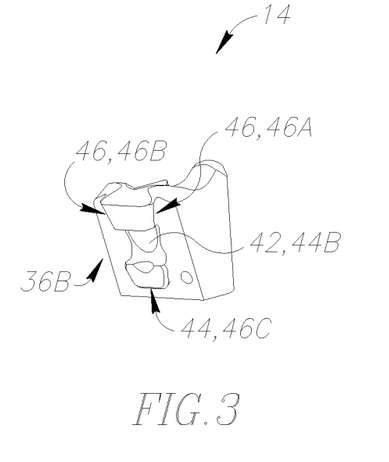
FIG. 3 is a rear perspective view of a head component of the tool assembly in FIG. 1.

Reference is made to FIGS. 1 to 3, which illustrate a machine tool assembly 10 comprising a body component 12, head component 14 and fastener 16.

Figure 4A:
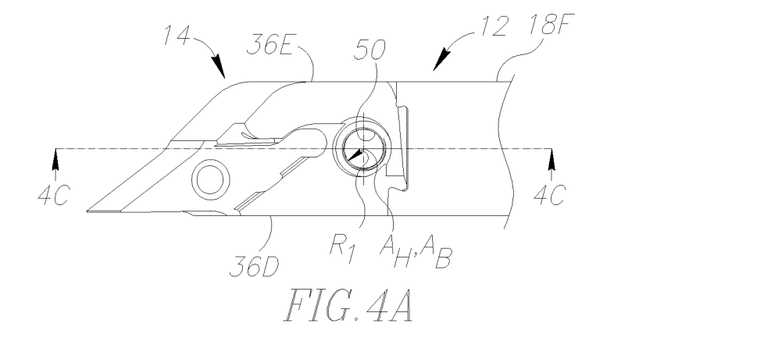
FIG. 4A is a top view of the head component and a part of the body component in FIGS. 1 to 3.

The body component 12 can be elongated along a longitudinally extending body component axis $A_L$. The body component 12 can comprise a first body surface 18A, a second body surface 18B located at an opposing side of the body component 12 from the first body surface 18A, and first, second, third and fourth body peripheral surfaces 18C, 18D, 18E, 18F extending therebetween (the first body peripheral surface 18C is best shown in FIG. 4B and the fourth body peripheral surface 18F is best shown in FIG. 4A).

The first body surface 18A can comprise a body fastening arrangement 20 formed thereon. For example, the body fastening arrangement 20 can comprise body dovetail surfaces (e.g. first, second and third body dovetail surfaces 20A, 20B, 20C), each of which can form an acute external angle with a body central portion 20D of the first body surface 18A.

Figure 4B:
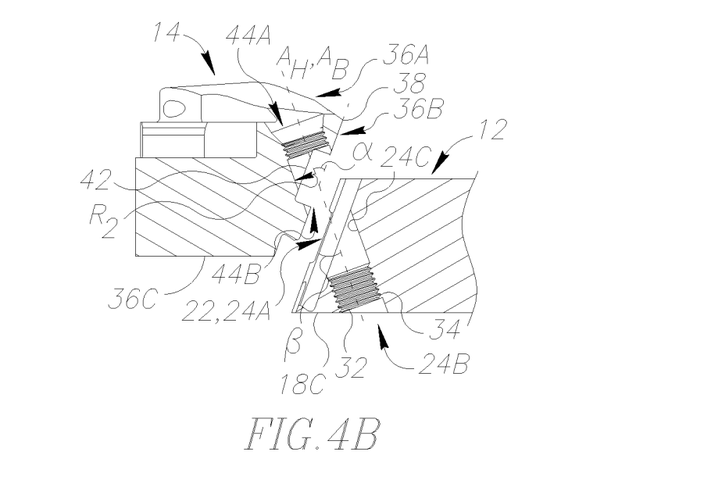
FIG. 4B is a cross section view generally corresponding to a plane corresponding to the section line 4C-4C in FIG. 4A, except that the head component and body component are spaced from each other.

Referring also to FIG. 4B, the body component 12 can further comprise a body hole 22 opening out at a first end 24A to the first body surface 18A, and, more precisely, to the body central portion 20D.

The body hole 22 can open out at a second end 24B to the first body peripheral surface 18C.

The first body surface 18A and first body peripheral surface 18C can be adjacent surfaces sharing a body edge 26.

The first body surface 18A can be formed with a plurality of body abutment surfaces (e.g. first, second, third and fourth body abutment surfaces 28A, 28B, 28C, 28D). The body abutment surfaces 28A, 28B, 28C, 28D can be located along the periphery of the first body surface 18A. More precisely, they can be located at the corners of the first body surface 18A. The body abutment surfaces 28A, 28B, 28C, 28D can be separated by body recessed portions of the first body surface 18A (e.g. first, second, third and fourth body recessed portions 30A, 30B, 30C, 30D).

The body hole 22 comprises a body hole inner surface 24C. The body hole 22, and more precisely the body hole inner surface 24C, can be formed with a body fastener retention arrangement 32 in the form of an internal body threading.

A body axis $A_B$ can extend through the center of the body hole 22.

The first body surface 18A can form an acute internal angle β of 40° with the body hole axis $A_B$.

The body fastener retention arrangement 32 can extend several times around the circumference of the body hole 22. For example, six ridges 34 are shown on one side of the body hole 22. Accordingly, in this example the body fastener retention arrangement 32 extends about six revolutions around the body hole 22.

Figure 4C:
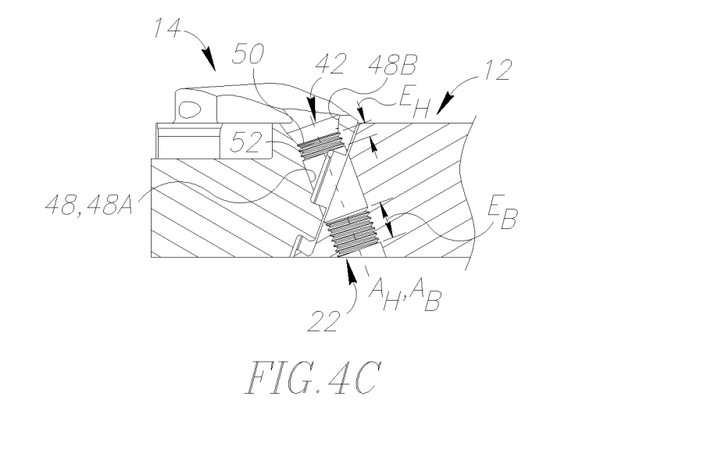
FIG. 4C is a cross section view taken along line 4C-4C in FIG. 4A.

Referring also to FIG. 4C, the body fastener retention arrangement 32 also extends a body axial extent $E_B$, measurable parallel with the body axis $A_B$.

Referring now to FIGS. 1, 3, 4A and 4B, the head component 14 can comprise a first head surface 36A and a second head surface 36B. The first head surface 36A and a second head surface 36B can be adjacent surfaces sharing a head edge 38. The head component 14 can further comprise a third head surface 36C opposing the first head surface 36A, and opposing first and second head peripheral surfaces 36D, 36E which extend between the first head surface 36A and third head surface 36C.

The first head surface 36A can be formed with an insert seating arrangement 40. The insert seating can be configured for receiving a removable cutting insert (not shown).

The head component 14 can further comprise a head hole 42 opening out at a first end 44A to the first head surface 36A. The head hole 42 can open out at a second end 44B to the second head surface 36B.

A head hole axis $A_H$ can extend through the center of the head hole 42. When the head component 14 is mounted on the body component 12, the head and body axes $A_H$, $A_B$ can be coaxial (for illustrative purposes only, the position of the body and head components 12, 14 in FIG. 4b were arbitrarily shown in positions where the head and body axes $A_H$, $A_B$ are coaxial).

The second head surface 36B can form an acute internal angle α of 40° with the head hole axis $A_H$.

Drawing attention to FIG. 3, the second head surface 36B can comprise a head fastening arrangement 46 formed thereon. For example, the head fastening arrangement 46 can comprise head dovetail surfaces (e.g. first, second and third head dovetail surfaces 46A, 46B, 46C), each of which can form an acute external angle with the second head surface 36B.

When the head component 14 is mounted on the body component 12, the second head surface 36B, can contact the body abutment surfaces 28A, 28B, 28C, 28D. Additionally, the complimentary body and head dovetail surfaces 20, 46 can interlock to hold the body and head components 12, 14 together.

Referring to FIG. 4C, the head hole 42 comprises a head hole inner surface 48.

The head hole inner surface 48 can further comprise a cylindrical head hole portion 48A adjacent to the second head surface 36B and a tapered head hole portion 48B adjacent to the first head surface 36A.

The head hole 42, and more precisely the head hole inner surface 48, can be formed with a head fastener retention arrangement 50 in the form of an internal head threading. More precisely, the head fastener retention arrangement 50 can be formed on the cylindrical head hole portion 48A. Even more precisely, the head fastener retention arrangement 50 can be formed on the cylindrical head hole portion 48A at a portion thereof adjacent to the tapered head hole portion 48B.

The head fastener retention arrangement 50 can extend several times around the circumference of the head hole 42. For example, two ridges 52 are shown on one side of the head hole 42. Accordingly, in this example the head fastener retention arrangement 50 extends about two revolutions around the head hole 42.

The head fastener retention arrangement 50 also extends a head axial extent $E_H$, measurable parallel with the head axis $A_H$.

Referring to FIGS. 4A and 4B, it is further shown that the head fastener retention arrangement 50 has a head fastener retention radius $R_1$, which is smaller than a head hole radius $R_2$ of the head hole 42 (more precisely, the head hole radius $R_2$ can be considered the radius of the head hole inner surface 48, and even more precisely can be considered the radius of the cylindrical head hole portion 48A). It will be understood that the head fastener retention radius $R_1$ defines an inscribed circle of the head fastener retention arrangement 50.

Figure 5A:
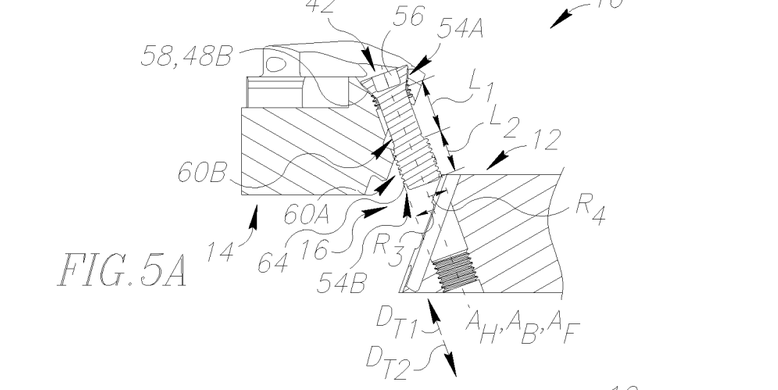
FIG. 5A shows a first position in which the fastener is mounted to the head component and they are spaced apart from the body component.

Referring to FIG. 5A, the fastener 16 can comprise a fastener head 54A and a fastener shank 54B extending therefrom.

The fastener 16 can be elongated.

A fastener axis $A_F$ can extend through the center of the fastener 16. More precisely, the fastener axis $A_F$ can extend through the center of the fastener shank 54B.

The fastener head 54A can comprise a tool receiving recess 56 configured for receiving a tool (not shown, e.g. a screw driver) to allow the fastener 16 to be rotated thereby.

The fastener head 54A can have a tapered shape. More precisely, a fastener head outer surface 58 can have a corresponding tapered shape to the tapered head hole portion 48B. More precisely the fastener head 54A reduces in diameter with increasing proximity to the fastener shank 54B.

The fastener shank 54B can comprise a first shank portion 60A and a second shank portion 60B extending between the first shank portion 60A and the fastener head 54A.

The first shank portion 60A has an axial length $L_1$, measurable parallel with the fastener axis $A_F$.

The second shank portion 60B has an axial length $L_2$, measurable parallel with the fastener axis $A_F$.

The axial length $L_2$ can be longer than the axial length $L_1$.

The fastener shank 54B is longer than the head hole 42.

The axial length $L_2$ can, by itself, even be longer than the head hole 42.

The fastener shank 54B can comprise an external arrangement 62, e.g. in the form of an external shank threading. More precisely, the external arrangement 62 can be formed on only the first shank portion 60A.

The second shank portion 60B can have a radius, schematically shown designated as $R_3$.

The first shank portion 60A, not considering the external arrangement 62, also has a similar radius $R_3$.

The external arrangement 62 has an outermost radius $R_4$ (e.g. measurable from the fastener axis $A_F$ to a fastener ridge 64) which is larger than the head fastener retention radius $R_1$.

Accordingly, the fastener 16 cannot be removed from the head hole 42 by translational movement only but requires rotational movement for the fastener ridges 64 to bypass the head fastener retention arrangement 50.

Referring to FIGS. 5A to 5D, assembly and disassembly of the machine tool assembly 10 will be described.

In FIG. 5A, a first position is shown with the fastener 16 mounted to the head component 14, both of which are spaced apart from the body component 16. More precisely the tapered head hole portion 48B and fastener head outer surface 58 are in contact. Since the fastener 16, on both sides of the second shank portion 60 which extends through the head hole 42, has a larger diameter than the head hole 42, the fastener 16 cannot be removed from the head hole 42 in either direction with only translational movement (shown schematically by arrows $D_{T1}$, $D_{T2}$ which are parallel with the head hole axis $A_H$).

However, the fastener 16 can be removed, if desired, from the head hole 42 if moved in the direction of arrow $D_{T1}$ together with a rotational movement about head hole axis $A_H$ upon contact between the external arrangement 62 and head fastener retention arrangement 50.

Figure 5B:
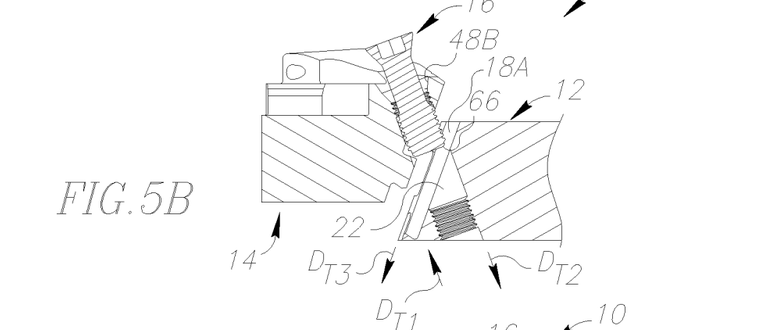
FIG. 5B shows a second position in which only the fastener contacts the body component.

In FIG. 5B, a second position is shown where a bottom corner 66 abuts the first body surface 18A moving the fastener 16 in the direction of arrow $D_{T1}$ (such movement being arrested by contact of the external arrangement 62 and head fastener retention arrangement 50).

Figure 5C:
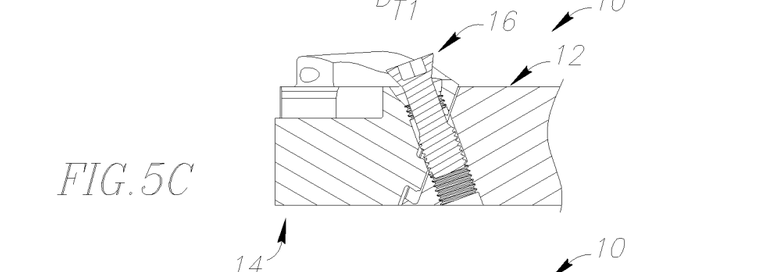
FIG. 5C shows a third position in which the head and body components are in an assembled, non-fastened position (i.e. the head and body components are assembled in that they are contacting each other in a position that will be used for machining; however they are not fastened to each other via the fastener)

It is noted that the fastener 16 is not directly inserted into the body hole 22 since the complementary body and head dovetail surfaces 20, 46 (FIGS. 2 and 3) require some sliding motion to be interlocked. Accordingly, the second shank portion 60B being configured to allow sliding motion within the head hole 42 can facilitate swift assembly of the machine tool assembly 10. The head component 14 is then moved in the direction of arrow $D_{T3}$ (i.e. parallel to the first body surface 18A and second head surface 36B) until the fastener shank 54B enters the head hole 42 and the body and head dovetail surfaces 20, 46 interlock as shown in FIG. 5C.

Figure 5D:
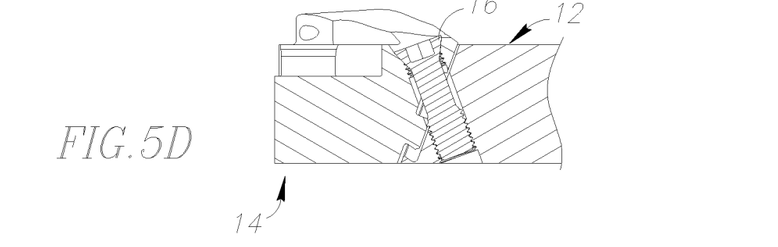
FIG. 5D shows a fourth position in which the head and body components in an assembled, fastened position, corresponding to the position in FIG. 5C except with the fastener fastening the head component to the body component.

The fastener 16 can then be rotated until reaching the assembled, fastened position shown in FIG. 5D.

To remove the head component 14 from the body component 16, the above described steps can be carried out in reverse order.

The description above includes an exemplary embodiment and details, and does not exclude non-exemplified embodiments and details from the claim scope of the present application.

What is claimed is:

1. A machine tool assembly comprising:
a body component; a head component; and a fastener comprising a fastener head and a fastener shank extending therefrom, the fastener shank having an external shank threading;
the body component comprising:
a first body surface; a body fastening arrangement formed on the first body surface; and a body hole opening out to the first body surface;
the head component comprising:
first and second head surfaces; a head fastening arrangement formed on the second head surface and configured to interlock with the body fastening arrangement; and a head hole opening out at a first head hole end to the first head surface and at a second head hole end to the second head surface;
wherein:
the head hole is formed with an internal head threading and the body hole is formed with an internal body threading;
the body threading and the head threading are each configured to threadingly engage the external shank threading; and
in an assembled, fastened position, the head component is held to the body component via interlocking of the head and body fastening arrangements, and the fastener shank extends through the head hole and into the body hole, with the fastener head abutting the first head surface and the shank threading engaging only the internal body threading and not the internal head threading.

2. The machine tool assembly according to claim 1, wherein the assembly comprises only a single fastener configured for connecting the head and body components.

3. The machine tool assembly according to claim 1, wherein the head and body fastening arrangements are configured to interlock via sliding movement of the first body surface relative to the second head surface.

4. The machine tool assembly according to claim 1, wherein the second head surface forms an acute internal angle α with a head hole axis of the head hole, as follows: $20° \leq \alpha \leq 60°$.

5. The machine tool assembly according to claim 1, wherein the head threading extends circumferentially around the head hole less than the body threading extends circumferentially around the body hole.

6. The machine tool assembly according to claim 1, wherein the head threading extends less than three revolutions around the head hole.

7. The machine tool assembly according to claim 1, wherein the head threading extends an axially extent through the head hole less than an axial extent of the body threading through the body hole.

8. The machine tool assembly according to claim 1, wherein the fastener shank comprises a first shank portion and a second shank portion extending between the first shank portion and the fastener head; the shank threading being formed on only the first shank portion, and the second shank portion being devoid of threading.

9. The machine tool assembly according to claim 8, wherein the second shank portion is longer than the head hole.

10. The machine tool assembly according to claim 8, wherein the second shank portion is longer than the first shank portion.

11. The machine tool assembly according to claim 1, wherein the head component is made of metal.

12. The machine tool assembly according to claim 1, wherein the head component is made of a harder material than the fastener.

13. The machine tool assembly according to claim 1, wherein in said assembled, fastened position:
the body hole opens out to a body central portion; and
the fastener shank enters the first body surface at an acute angle.

* * * * *